US006941990B2

(12) United States Patent

Rooney

(10) Patent No.: US 6,941,990 B2

(45) Date of Patent: Sep. 13, 2005

(54) OFF-ROAD TIRES HAVING SIDEWALL ANTI-PUNCTURE PADS

(75) Inventor: Timothy Michael Rooney, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 259 days.

(21) Appl. No.: 10/320,870

(22) Filed: Dec. 17, 2002

(65) Prior Publication Data

US 2004/0112497 A1 Jun. 17, 2004

(51) Int. Cl.[7] ................................................ B60C 13/02

(52) U.S. Cl. ....................... 152/454; 152/523; D12/605

(58) Field of Search ........................... 152/523, 209.12, 152/454; D12/605

(56) References Cited

U.S. PATENT DOCUMENTS

| | | | | |
|---|---|---|---|---|
| 1,530,574 A | * | 3/1925 | Paull | 152/523 |
| D129,564 S | * | 9/1941 | Rideout | D12/605 |
| D168,494 S | | 12/1952 | Beckman | D90/20 |
| 2,761,489 A | * | 9/1956 | Kraft | 156/116 |
| 3,457,980 A | * | 7/1969 | Lauritsen | 152/523 |
| 4,219,066 A | * | 8/1980 | Tamura et al. | 152/523 |
| 4,446,902 A | | 5/1984 | Madec et al. | 152/209 |
| 4,687,037 A | | 8/1987 | Pfeiffer et al. | 152/209 |
| 4,711,283 A | | 12/1987 | Bonko et al. | 152/209 |
| D308,038 S | | 5/1990 | Guidry | D12/146 |
| 5,259,429 A | | 11/1993 | Harms | 152/209 |
| 5,373,884 A | * | 12/1994 | Kamegawa et al. | 152/454 |
| 5,375,639 A | | 12/1994 | Suzuki et al. | 152/209 |
| 5,375,640 A | | 12/1994 | Harms | 152/209 |
| 5,417,269 A | | 5/1995 | Kinoshita et al. | 152/209 |
| 6,021,829 A | | 2/2000 | Rooney | 152/209.12 |
| 6,123,131 A | * | 9/2000 | Takada | 152/454 |
| 6,401,774 B1 | | 6/2002 | Rooney | 152/209.12 |

FOREIGN PATENT DOCUMENTS

| | | | | |
|---|---|---|---|---|
| CA | 1183438 | * | 3/1985 | 152/454 |
| FR | 1163341 | | 9/1958 | |
| FR | 2201193 | | 4/1974 | |
| GB | 1236335 | | 6/1971 | |
| GB | 2021049 | | 11/1979 | |
| JP | 58152604 | | 9/1983 | |
| JP | 61081207 A | * | 4/1986 | |
| JP | 10119516 | | 5/1998 | |

* cited by examiner

*Primary Examiner*—Geoffrey L. Knable

(74) *Attorney, Agent, or Firm*—Wood, Herron & Evans, L.L.P.

(57) ABSTRACT

Pneumatic off-road tires having structure for improving sidewall puncture resistance to penetrating objects. The structure may include multiple deflection pads arranged concentrically about the sidewall or a single deflection pad extending in a spiral about the sidewall. Each deflection pad incorporates inclined surfaces arranged for deflecting penetrating objects in a radial direction so that the likelihood of a sidewall puncture is significantly reduced.

9 Claims, 5 Drawing Sheets

OFF-ROAD TIRES HAVING SIDEWALL ANTI-PUNCTURE PADS

FIELD OF THE INVENTION

The present invention generally relates to tires and, more specifically, to pneumatic off-road vehicle tires.

BACKGROUND OF THE INVENTION

Pneumatic tires for off-road vehicles incorporate a tread designed to provide high traction in non-paved surfaces, such as soft earth or ground, frequently encountered by earthmoving equipment, agricultural vehicles, sport utility vehicles, military vehicles, lawn and garden vehicles, all-terrain vehicles (ATV's), and dirt bikes. Frequently, pneumatic tires for off-road applications have low operating pressures and minimal belt reinforcements. For example, ATV tires generally operate at a pressure of less than 5 pounds per square inch (psi) and frequently lack any belt reinforcing structure.

Pneumatic off-road tires are prone to sidewall punctures resulting in a loss of tire pressure or deflation. Sidewall punctures arise from penetrating or sharp objects such as rocks, thorns, sticks, stubble, or bushes, in the surrounding environment that contact and penetrate the sidewall causing the tire to lose tire pressure either quickly or gradually. The sidewall punctures may be manifested as perforations or slits affording an escape route for the pressurized fluid filling the tire. The occurrence of sidewall punctures is unpredictable and, typically, off-road vehicles carry a repair kit or a spare tire in anticipation of such an event. Repair kits are inconvenient to carry and, although simple perforations can be repaired using the repair kit, large perforations and slits are, at the least, more difficult to repair. In addition, repairs made using the repair kit may be time consuming and, in many conditions such as mud, snow, and uneven rocky terrain, may be challenging to perform. If a spare tire is unavailable or the repair kit is ineffective for repairing the sidewall puncture, the vehicle occupants, such as farmers, hunters, fishing enthusiasts and recreational ATV riders, must travel by foot from a remote location over potentially difficult terrain to obtain assistance.

Thickening the sidewall may reduce the likelihood that a sharp object can puncture the sidewall of an off-road tire. Conventional approaches for thickening the sidewall include either adding material in the form of additional plies or an increased rubber thickness. In particular, conventional run-flat or tires have been developed that incorporate relatively thick sidewalls having an increased rigidity capable of carrying the full vehicle load in the absence of inflation pressure. Due to the enhanced sidewall thickness, run-flat tires also provide tremendous puncture resistance. However, such conventional solutions do significantly increase the cost of manufacturing the off-road tire, which is ultimately transferred to the consumer in the retail price.

Pneumatic off-road tires may include a single, circumferential scuff rib that projects outwardly from the sidewall. Typically, the scuff rib provides resistance to sidewall scuffing arising from the abrasive effects of recurring contact between the tire sidewall and immovable objects, such as a curb or the like. The scuff rib typically extends from a planar outer surface toward the sidewall at an angle greater than about 45° measured relative to a base surface of the sidewall. However, the scuff rib can only assist in preventing sidewall punctures from sharp objects over the portion of the base surface actually covered by the scuff rib. The scuff rib cannot provide puncture resistance to sharp objects over the exposed base surface of the sidewall, which represents the greater part of the sidewall surface area.

For these and other reasons, it would be desirable to provide a pneumatic off-road tire having an improved sidewall puncture resistance while thickness of protective material incorporated into the sidewall.

SUMMARY OF THE INVENTION

The invention is directed to pneumatic off-road tires that significantly decrease the likelihood of a sidewall puncture. A pneumatic off-road tire constructed according to the principles of the invention includes a carcass having a circumferential sidewall, a tread radially outward of the carcass, and a plurality of axially-projecting deflection pads each of which extends circumferentially about the sidewall. In addition, each of the deflection pads includes a first tapered surface inclined in a first axial direction oriented generally toward the sidewall and a second tapered surface inclined in a second axial direction oriented generally away from the sidewall.

In an alternative embodiment of the invention, a pneumatic off-road tire includes a carcass having a circumferential sidewall, a tread radially outward of the carcass, and an axially-projecting deflection pad extending circumferentially about the sidewall in a spiral pattern. The deflection pad includes a first tapered surface inclined in a first axial direction oriented generally toward the sidewall and a second tapered surface inclined in a second axial direction oriented generally away from the sidewall.

A pneumatic off-road tire constructed with one or more deflecting pads according to the principles of the invention minimizes tire damage due to sidewall punctures without significantly increasing tire weight or degrading tire performance.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DEFINITIONS

"Axial" and "axially" means the lines or directions that are parallel to the axis of rotation of the tire.

"Axially Inward" means in an axial direction toward the equatorial plane.

"Axially Outward" means in an axial direction away from the equatorial plane.

"Bead" means the circumferentially substantially inextensible metal wire assembly that forms the core of the bead area, and is associated with holding the tire to the rim.

"Carcass" means a laminate of tire ply material and other tire components, excluding the tread.

"Circumferential" means circular lines or directions extending along the surface of the sidewall perpendicular to the axial direction.

"Inner" means toward the inside of the tire.

"Lugs" refer to discontinuous radial rows of tread rubber in direct contact with the road surface.

"Off-road tire" means a pneumatic tire having a primary use or working surface condition that is not on a paved road. Such tires include earthmover tires, agricultural tires, lawn and garden tires, and all-terrain vehicle tires, including, but not limited to off-road dirt bike tires and ATV tires.

"Outer" means toward the tire's exterior.

"Pneumatic tire" means a laminated mechanical device of generally toroidal shape usually an open-torus having beads and a tread and made of rubber, chemicals, fabric and steel or other materials. When mounted on the wheel of a motor vehicle, the tire through its tread provides traction and contains the fluid that sustains the vehicle load.

"Radial" and "radially" mean directions radially toward or away from the axis of rotation of the tire.

"Shoulder" means the upper portion of sidewall just below the tread edge.

"Sidewall" means that portion of a tire between the tread and the bead area.

"Tread" means a molded rubber component which, when bonded to a tire casing, includes that portion of the tire that comes into contact with the road when the tire is normally inflated and under normal load.

DETAILED DESCRIPTION

Figure 1:
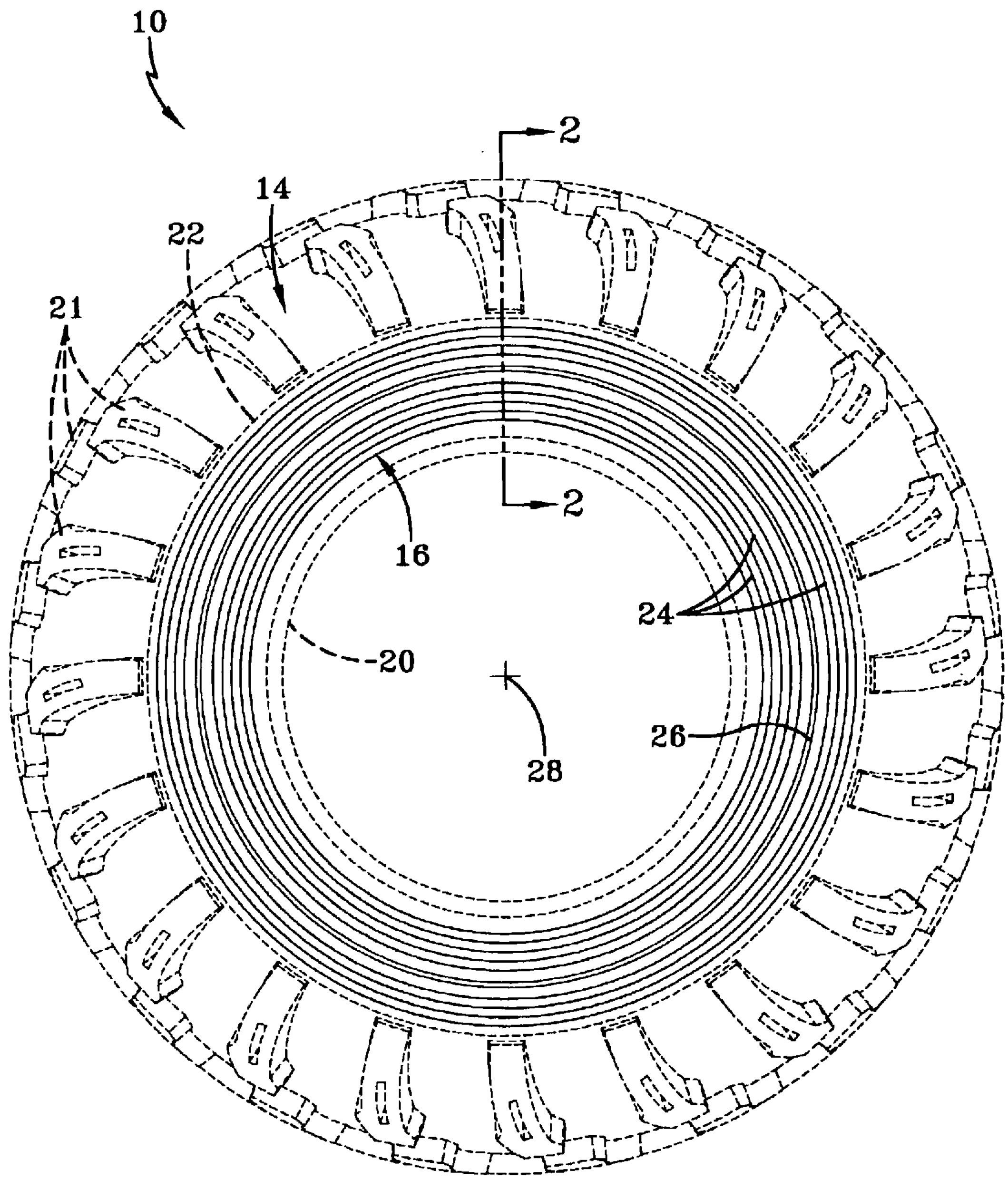
FIG. 1 is a side view of an off-road tire according to the principles of the invention.
Figure 2:
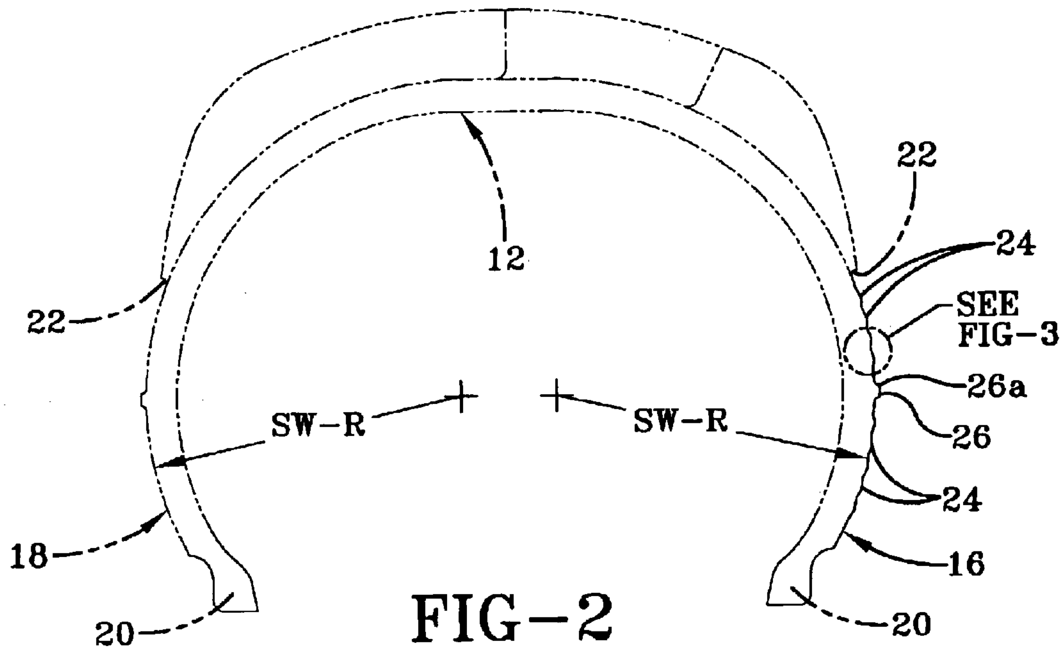
FIG. 2 is a cross-sectional view taken generally along line 2—2 in FIG. 1.
Figure 4:
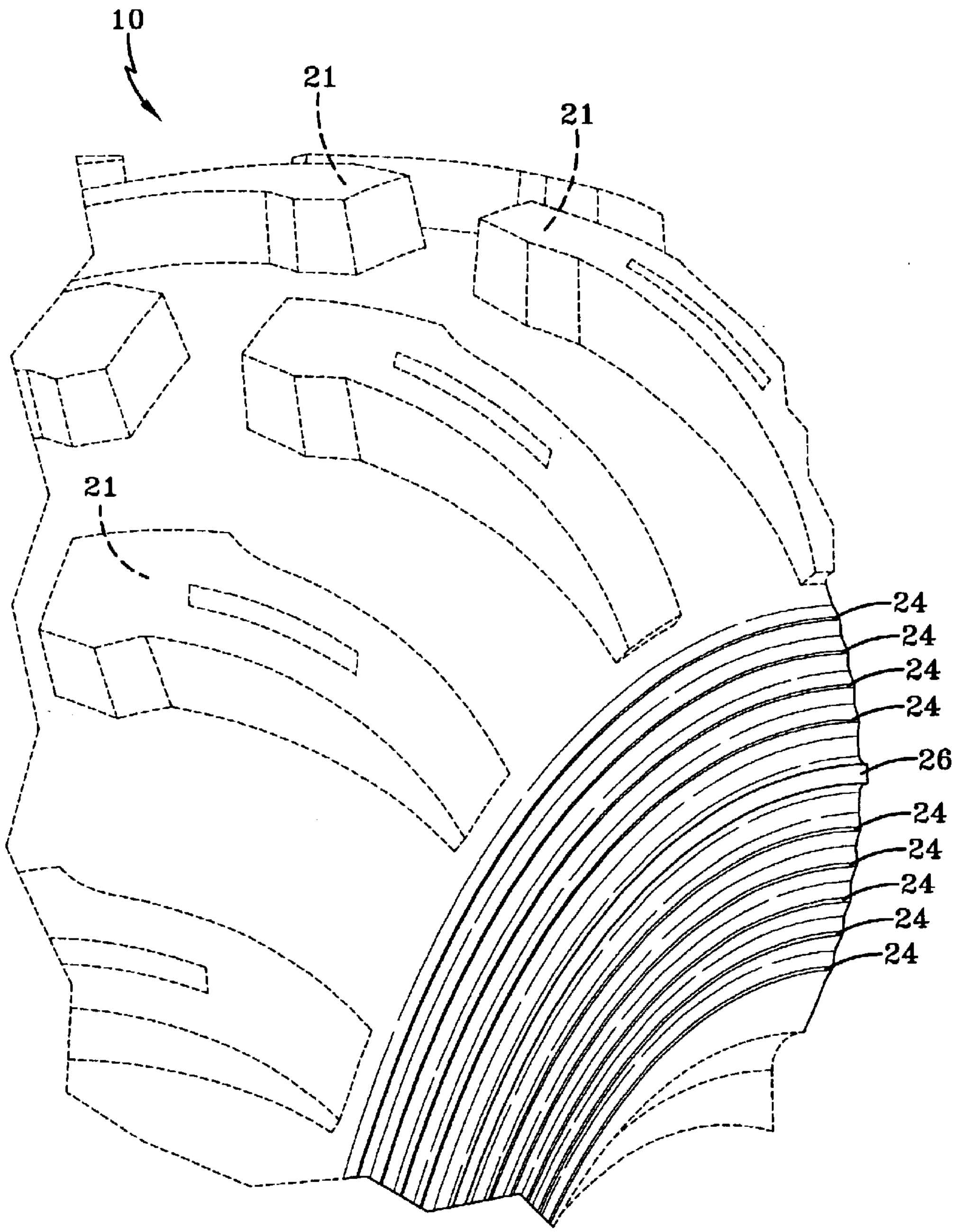
FIG. 4 is a perspective view of a portion of the off-road tire of FIG. 1.

With reference to FIGS. 1, 2 and 4, a pneumatic off-road tire 10 according to the invention includes a carcass 12, a ground-engaging tread 14, an outer sidewall 16, and an inner sidewall 18. Sidewall 16 faces axially outward when tire 10 is mounted to a rim and attached to a wheeled apparatus, such as a motor vehicle. Sidewall 16 is unprotected or unshielded by surrounding structure of the wheeled apparatus and, as a result, is subject to contact by penetrating or sharp objects present in the environment of the wheel apparatus. Sidewall 16 extends from a radially-inward bead 20 to a radially-outward shoulder 22 defined where the sidewall 16 merges with the tread 14. Tread 14 consists of a pattern of lugs 21 disposed radially outward of the carcass 12. The lugs 21 may be arranged in any pattern and may have any construction suitable to provide the necessary traction and lateral stability for operation of an off-road vehicle in an off-road environment and to expel earth accumulated in the channels between adjacent lugs 21 laterally of the tire 10. Carcass 12 and tread 14 have a conventional construction as apparent to persons of ordinary skill in the art, such as the tire construction for an all-terrain vehicle disclosed in U.S. Pat. No. 6,401,774.

Figure 3:
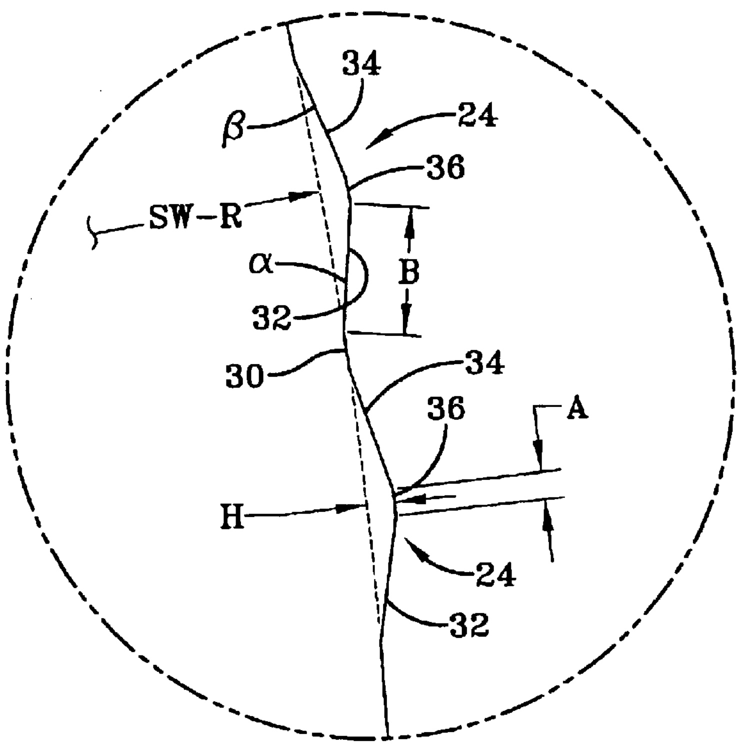
FIG. 3 is an enlarged view of a portion of FIG. 2.

Positioned on the sidewall 16 radially between bead 20 and shoulder 22 is a plurality of, for example, eight deflection pads 24. Disposed among the deflection pads 24 is a single curb scuff rib 26 that projects axially outward from the sidewall 16 and that extends about a circumference of the sidewall 16. The scuff rib 26 has a generally trapezoidal cross-sectional profile viewed in a direction tangent to the circumference of the sidewall 16 at any position about the circumference of tire 10. The scuff rib 26 typically extends toward the sidewall 16 at an angle greater than about 45° from a radially-outermost planar surface 26*a* toward a base surface 30 (FIG. 3). It is contemplated that the scuff rib 26 may be omitted from tire 10 without departing from the spirit and scope of the invention.

With continued reference to FIGS. 1, 2 and 4, the deflection pads 24 are arranged in a substantially concentric pattern centered on a centerline 28 of the tire 10. Typically, the centerline 28 coincides with an axis of rotation of the tire 10 when mounted to a motor vehicle. Each of the deflection pads 24 is continuous and uninterrupted in a circumferential direction about the sidewall 16. Discontinuous structures raised axially from the sidewall 16 would result in the transfer of intermittent impulses or jolts to the motor vehicle from objects contacting the sidewall 16 of tire 10. The number of deflection pads 24 is determined such that sufficient puncture protection from sharp objects is provided over the entire outwardly-facing area of the sidewall 16 as tire 10 rotates. Typically, the number of deflection pads 24 ranges between four and twelve, although the invention is not so limited.

With reference to FIG. 3, each of the deflection pads 24 projects axially outwardly from sidewall 16 an axial distance from the base surface 30 of the sidewall 16. Base surface 30 extends radially and circumferentially over portions of the sidewall 16 exposed between adjacent pairs of deflection pads 24 and beneath the deflection pads 24. Typically, the radial dimension of each of the exposed portions, which are not covered by the deflection pads 24, is less than or equal to about 0.25 inches (6.4 mm). It is appreciated that the deflection pads 24 may be arranged on sidewall 16 such that the exposed portions are absent. The base surface 30 has a slight convex curvature with a radius of curvature of SW-R between the bead 20 and shoulder 22, which causes each deflection pad 24 to possess a slight curvature.

Each deflection pad 24 includes an opposed pair of radial surfaces or sides 32, 34 that are interconnected by an apex or planar surface 36. The deflection pads 24 operate for deflecting away objects impinging against the sidewall 16, when in service on a moving motor vehicle, otherwise capable of puncturing the sidewall 16. Specifically, the deflection pads 24 deflect objects radially, which reduces the axial component of a penetration force applied by the contacting object to sidewall 16. The deflection pads 24 also increase the effective thickness of covered portions of base surface 30 for enhancing puncture resistance.

With continued reference to FIG. 3, the opposed radial sides 32, 34 of each deflection pad 24 have a dimension or thickness measured axially relative to base surface 30 that varies according to the radial position between the bead 20 and shoulder 22. Radial side 32 is sloped radially inwardly at an inclination angle, $\alpha$, measured relative to base surface 30 so that the thickness increases with increasing radius toward shoulder 22. Radial side 34 is sloped radially outwardly at an inclination angle, $\beta$, measured relative to base surface 30, so that the thickness decreases with increasing radius toward shoulder 22. The inclination angle of each of the radial sides 32, 34 is typically in a range of less than, or equal to, about 30° and, more typically, between about 10° and about 20°. The slope of each of the radial sides 32, 34 is approximately linear so that, for example, the axial dimension of each is approximately halved at the respective midpoints between the base and planar surfaces 30, 36. It is contemplated by the invention that the individual inclination angles of the radial sides 32, 34 may differ so that radial sides 32, 34 are asymmetrical relative to the mid-point of planar surface 36.

Each of the deflection pads 24 also has an axial height, H, measured relative to the base surface 30 and, typically, measured between the base and planar surfaces 30, 36. It is contemplated by the invention that the planar surface 36 may be omitted such that the radial sides 32, 34 converge at an apex formed by a circumferentially-extending ridge (not shown). Typically, the axial height of each deflection pad 24 is less than about 0.2 inches (5.1 mm) and may be as small as 0.1 inch (2.5 mm) for small-diameter tires, such as ATV tires.

Each of the radial sides 32, 34 has a dimension, B, proportional to the axial height and the corresponding inclination angle, which is measured in a direction tangent to the circumference of deflection pad 24. In the illustrated embodiment, the radial dimension is the length of the hypotenuse of a right triangle defined by each of the radial sides 32, 34. It is appreciated by persons of ordinary skill in the art that the tire manufacturing process will introduce concave or convex irregularities in radial sides 32, 34 that result in deviations from absolute planarity. Planar surface 36 typically has a radial dimension, A, of less than or equal to about 0.2 inches (5.1 mm) so as not to inhibit the ability of the deflection pads 24 to radially deflect objects encountered by the tire 10.

Figure 3A:
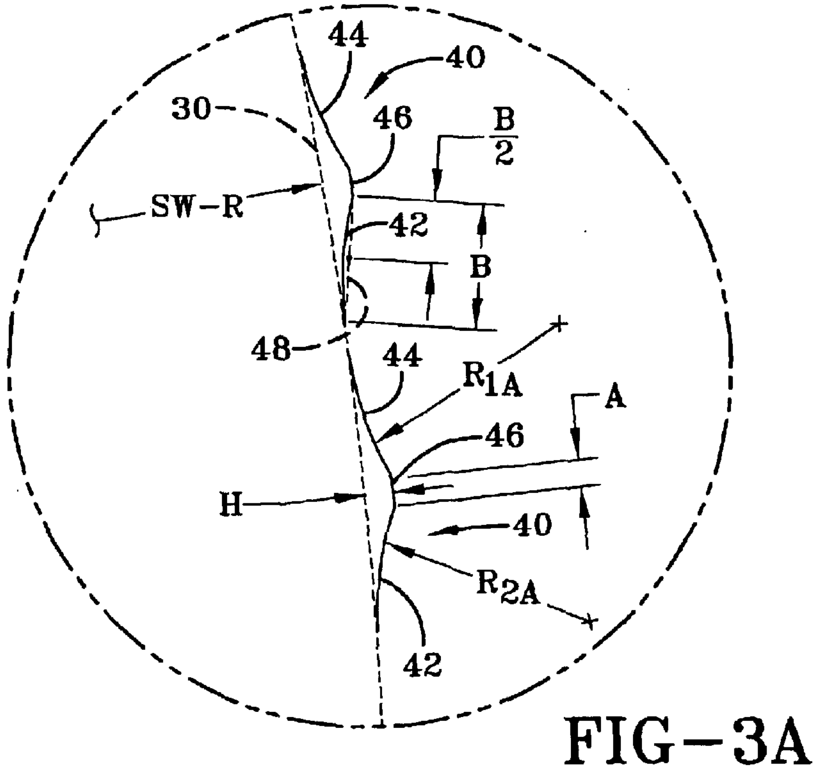
FIG. 3A is a cross-sectional view similar to FIG. 3 depicting an alternative embodiment of a deflection pad according to the principles of the invention.

With reference to FIG. 3A in which like reference numerals refer to like features in FIG. 3 and in an alternative embodiment, tire 10 is provided with deflection pads 40 each constructed according to the principles of the invention with cusped or concave radial surfaces or sides 42,44 joined by a planar surface 46. Each of radial sides 42,44 deviates in geometrical shape from a planar surface, indicated diagrammatically by a dashed line 48 in FIG. 3A. Specifically, the radial sides 42, 44 each have a corresponding radius of curvature, $R_{1A}$ and $R_{1B}$, capable of deflecting objects radially and away from contact with base surface 30. Radial side 42 is sloped radially inwardly so that the thickness increases with increasing radius toward shoulder 22. Radial side 44 is sloped radially outwardly so that the thickness decreases with increasing radius toward shoulder 22. As used herein, the terms "sloped," "tapered" and "inclined" may mean either planar or concave. The radius of curvature should provide a material thickness, measured axially relative to the base surface 30 and radially at the surface mid-point, B/2, which is at least 25 percent of the axial height, H, of the deflection pad 40 and less than 50% of the axial height. The length of the radius of curvature determines the degree of curvature of each of the radial sides 42, 44. It is contemplated by the invention that the radius of curvature of radial side 42 may differ from the radius of curvature of radial side 44 may differ.

The deflection pads 40 are spaced apart in a radial direction such that portions of base surface 30 are exposed. Planar surface 46 typically has a radial dimension, A, of less than or equal to about 0.2 inches (5.1 mm) so as not to inhibit the ability of the deflection pads 40 to radially deflect objects encountered by the tire 10. Typically, each deflection pad 40 projects outwardly from the base surface 30 by an axial height of less than 0.2 inches (5.1 mm). Typically, the radial dimension of each of the exposed portions, which are not covered by the deflection pads 40, is less than or equal to about 0.25 inches (6.4 mm).

Figure 3B:
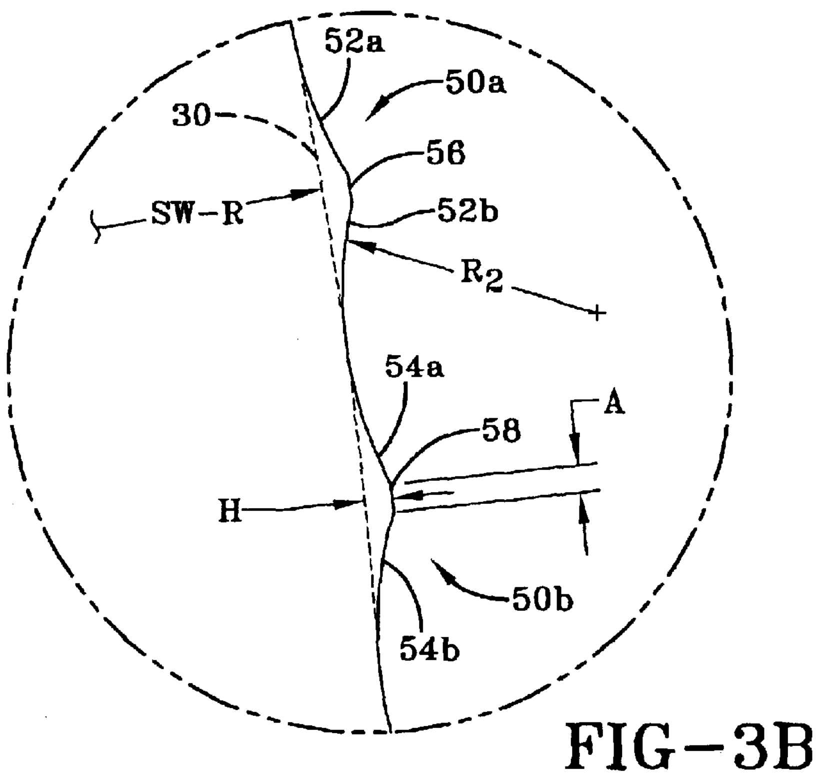
FIG. 3B is a cross-sectional view similar to FIGS. 3 and 4 depicting an alternative embodiment of a deflection pad according to the principles of the invention.

With reference to FIG. 3B in which like reference numerals refer to like features in FIGS. 3 and 3A and in an alternative embodiment of the invention, tire 10 is provided with a plurality of between four and twelve deflection pads, of which two deflection pads 50*a* and 50*b* are shown. Deflection pad 50*a* has a pair of cusped or concave radial surfaces or sides 52*a,b* joined by a planar surface 56. Similarly, deflection pad 50*b* has a pair of cusped or concave radial sides or surfaces 54*a,b* joined by a planar surface 58. Radial side 52*b* of deflection pad 50*a* is smoothly continuous with radial side 54*a* of the adjacent deflection pad 50*b*. Specifically, radial sides 52*b* and 54*a* are curved about a shared or common radius of curvature, $R_2$, which is selected in magnitude for deflecting objects radially and away from contact with base surface 30. The radius of curvature should provide a material thickness, measured relative to the base surface 30 and radially at the mid-point of each of surfaces 52*b*, 54*a*, which is at least 25 percent of the axial height, H, of the deflection pads 50*a,b*. Radial side 52*b* is sloped with a decreasing thickness in a radial-outward direction toward the shoulder 22 and radial side 54*a* is sloped with a decreasing thickness in a radially-inward direction toward bead 20. The length of the radius of curvature determines the degree of curvature of the radial sides 52*b*, 54*a*. Adjacent pairs of radial sides of the remaining deflection pads on tire 10 may have a similar or identical construction to radial sides 52*b*, 54*a*.

The radial sides 52*b*, 54*a* merge or converge so that base surface 30 is not exposed. Planar surfaces 56 and 58 typically have a radial dimension, A, of less than or equal to about 0.2 inches (5.1 mm) so as not to inhibit the ability of the deflection pads 50*a,b* to radially deflect objects encountered by the tire 10. Typically, each of the deflection pads 50*a,b* projects outwardly from the base surface 30 by an axial height of less than 0.2 inches (5.1 mm).

Figure 5:
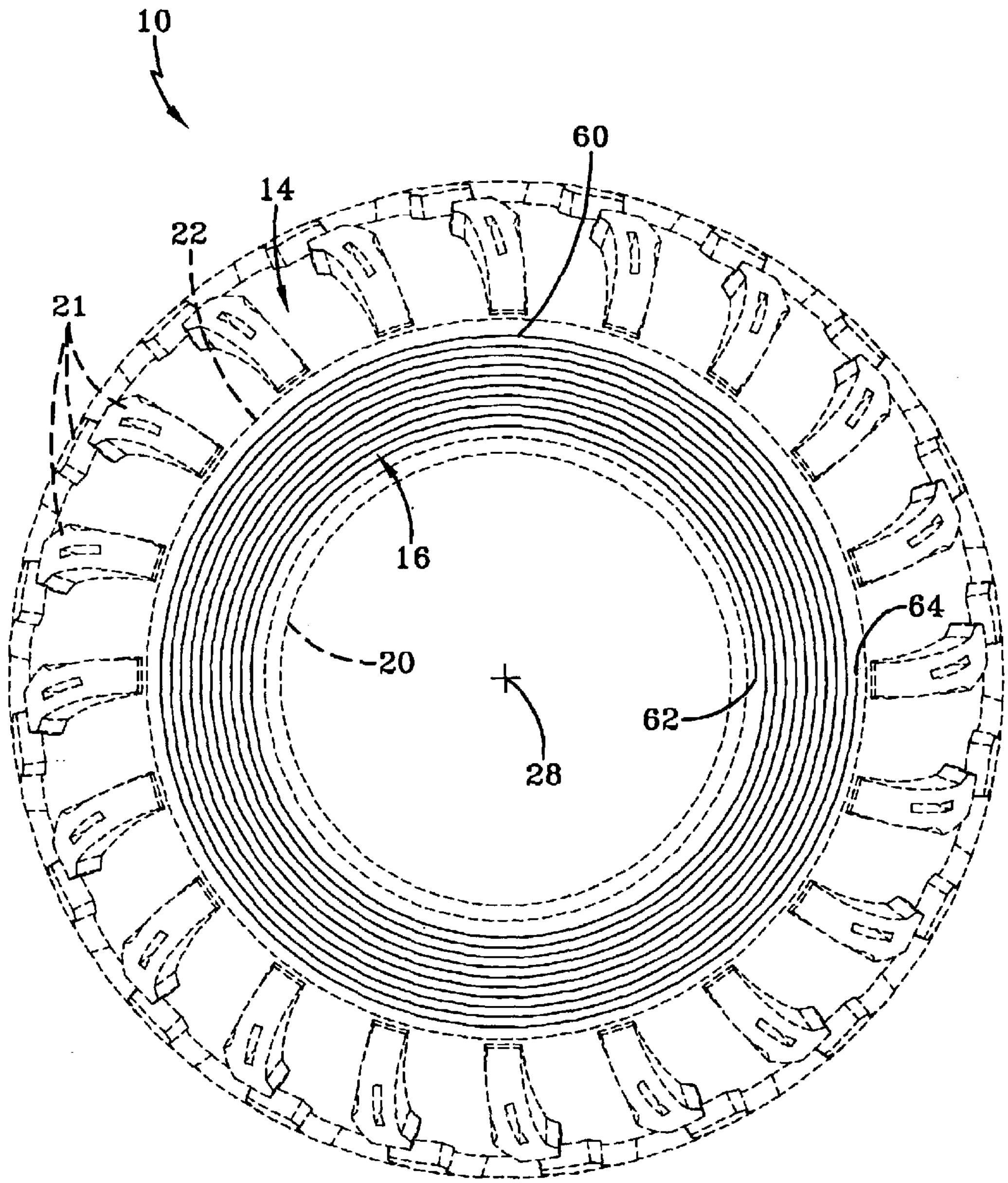
FIG. 5 is a side view of an off-road tire according to an alternative embodiment of the invention.

With reference to FIG. 5 in which like reference numerals refer to like features in FIGS. 1, 2 and 4 and in an alternative embodiment of the invention, tire 10 may be provided with a single deflection pad 60 that traces a spiral path about the sidewall 18. Deflection pad 60 progressively increases in radial dimension relative to centerline 28 between a terminal end 62 adjacent to the bead 20 and a terminal end 64 proximate to the shoulder 22. The deflection pad 60 is continuous and uninterrupted in the circumferential direction and has a substantially uniform intra-pad spacing in the radial direction. The deflection pad 60 may have a cross-sectional profile, in a direction tangent to the circumference of the deflection pad 60, similar or identical to any of the cross-sectional profiles shown herein in FIGS. 3, 3A and 3B that is capable of deflecting objects encountered by the tire 10 in a radial direction.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of applicant's general inventive concept.

What is claimed is:

1. An off-road tire comprising:

a carcass having an axis of rotation and a circumferential sidewall centered about said axis of rotation;

a tread radially outward of said carcass; and a plurality of deflection pads each projecting axially from said sidewall and extending circumferentially about said sidewall, each of said deflection pads including a generally-planar apex surface, a generally-planar first tapered surface inclined from said sidewall toward said apex surface, and a generally-planar second tapered surface inclined from said sidewall toward said apex surface, said apex surface joining said first and second tapered surfaces, and said first and said second tapered surfaces each inclined relative to said sidewall at an angle between about 10° and about 20°.

2. The off-road tire of claim 1 wherein said deflection pads are circular and concentric about said axis of rotation.

3. The off-road tire of claim 1 wherein said apex surface projects less than 5.1 millimeters from said sidewall.

4. The off-road tire of claim 3 wherein said apex surface projects less than 2.5 millimeters from said sidewall.

5. An off-road tire comprising:

a carcass having a circumferential sidewall;

a tread radially outward of said carcass; and an axially-projecting deflection pad extending circumferentially about said sidewall in a spiral pattern, said deflection pad including an apex, a generally-planar first tapered surface inclined at an angle of less than about 30° from said sidewall toward said apex, and a generally-planar second tapered surface inclined at an angle of less than about 30° from said sidewall toward said planar apex surface, said apex joining said first and second tapered surfaces, said first and said second tapered surfaces being inclined relative to said sidewall at an angle of less than about 30°.

6. The off-road tire of claim 5 wherein said apex is an axially-outermost generally-planar surface.

7. The off-road tire of claim 5 wherein said first and said second tapered surfaces are each inclined relative to said sidewall at an angle between about 10° and about 20°.

8. The off-road tire of claim 5 wherein said apex projects less than 5.1 millimeters from said sidewall.

9. The off-road tire of claim 8 wherein said apex surface projects less than 2.5 millimeters from said sidewall.

* * * * *

UNITED STATES PATENT AND TRADEMARK OFFICE

CERTIFICATE OF CORRECTION

PATENT NO. : 6,941,990 B2 Page 1 of 1
DATED : September 13, 2005
INVENTOR(S) : Rooney It is certified that error appears in the above-identified patent and that said Letters Patent is hereby corrected as shown below:

Column 2,
Line 6, add -- minimizing -- after “while”.

Signed and Sealed this

Thirty-first Day of January, 2006

JON W. DUDAS
*Director of the United States Patent and Trademark Office*